United States Patent Office 3,227,595
Patented Jan. 4, 1966

3,227,595
BONDED SYNTHETIC MICA LAMINATE
Lily Ho, Flushing, and Albert K. Levine, Whitestone, N.Y., assignors to General Telephone and Electronics Laboratories, Inc., a corporation of Delaware
No Drawing. Filed Sept. 5, 1961, Ser. No. 135,719
1 Claim. (Cl. 156—196)

This invention relates to insulating compositions and in particular to an insulating composition composed of bonded synthetic mica.

The term "mica" is used to define materials, belonging to a group of potassium aluminum silicate minerals and derivatives thereof which have high dielectric strength and which possess a characteristic crystallographic sheet-like structure. Mica is found in natural form and is also produced synthetically as fluorphlogopite having the formula $K_2Mg_6(Al_2Si_6O_{20})F_4$. In fluorphlogopite, fluoride ions replace the hydroxyl ions found in natural mica, the substitution of fluoride ions providing synthetic mica sheets having greater thermal stability than that of natural mica. In contrast, natural mica tends to decompose at elevated temperatures, the chemical reaction by which the hydroxyl groups combine to form water proceeding quite rapidly above 500° C. As a result, natural mica is not suitable for many electrical applications in which water must be rigorously excluded.

On the other hand, the excellent electrical and thermal properties of fluorphlogopite make it well suited for such applications. Fluorphlogopite is highly stable and does not deteriorate at temperatures above 1000° C. However, fluorphlogopite is produced by present methods in large batches consisting of intricately intergrown crystals and their separation into individual crystals is extremely difficult and expensive. Furthermore, the mechanical strength of the individual crystals or flakes is too low for many purposes. Consequently, it has not heretofore been practical to use fluorphlogopite as spacers in vacuum tubes, or in other applications where good dielectric properties and thermal stability must be combined with high mechanical strength.

Accordingly, it is an object of this invention to provide a synthetic mica product which has the characteristics of fluorphlogopite, which is relatively inexpensive to manufacture, and which is suitable for critical electronic applications such as tube spacers.

Another object is to provide a synthetic mica product having greatly improved mechanical strength.

Still another object is to provide a synthetic mica product suitable for use at high temperatures.

A further object is to provide a process for bonding together layers of synthetic mica paper to provide a laminate of greatly improved mechanical strength.

A still further object is to provide a synthetic mica product which does not emit gas or water vapor at elevated temperatures.

Yet another object is to provide an improved mica bonding agent.

These and other objects are attained in the present invention in which a sheet of fluorphlogopite is impregnated with an inorganic bonding mixture consisting of potassium orthophosphate, potassium tetraborate and boric acid. A laminate of desired thickness is prepared by interposing layers of the bonding mixture between successive sheets of fluorphlogopite. The laminate is then pressed at a moderate temperature and pressure to drive out the excess water after which it is hot-pressed at a relatively high temperature and pressure. The hot-pressing serves three purposes. First, it brings about a chemical reaction between the bonding mixture and the mica. Second, it drives off excess, chemically combined and other thermally generated volatiles; third, it compacts the mica thereby increasing its density and mechanical strength. The temperatures employed to bring about the bonding are in the range where natural mica tends to decompose; the synthetic mica, however, is fully stable.

The synthetic mica is produced in the conventional manner by first melting a large batch of reagents proportioned to give the desired composition and then cooling the mixture slowly to crystallize the mica. A typical method of making synthetic mica is described in the U.S. Bureau of Mines Report of Investigations 5283 titled "Synthetic Mica Investigation VIII: The Manufacture of Fluorphlogopite by the Internal Electric-Resistance Melting Process," by Hatch, Humphrey and Worden, published in December 1956. This process produces chunks of synthetic fluorphlogopite containing crystals intergrown in all directions. These chunks are then comminuted into small, thin flakes suitable for forming into mica paper by conventional paper making techniques. Alternatively, mica mats made by settling a slurry of delaminated mica flakes on a screen may be used.

The bonding mixture is prepared by adding distilled water at a temperature of about 60° C. to a solid mixture of tertiary potassium orthophosphate $K_3PO_4 \cdot xH_2O$, where $x$ is less than 1, potassium tetraborate

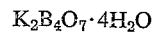

$$K_2B_4O_7 \cdot 4H_2O$$

and boric acid $H_3BO_3$. The percentage of potassium orthophosphate by weight can vary between 10 and 80% of the total solids in the mixture as can the percentages of potassium tetraborate and boric acid. The percent solid by weight in the aqueous solution may vary between 10 and 55%.

The bonding mixture is applied to a sheet of mica paper or to a mica mat by spraying, metering, or other convenient means. A laminated structure may be built up by spraying the bonding mixture on a first sheet of mica paper, placing a second sheet over the sprayed surface of the first sheet and continuing this process until the desired thickness is obtained. The sprayed laminate is then enclosed between two metal plates and put between the platens of a press held at a temperature of approximately 110° C. A slight pressure, which is just sufficient to permit moisture to escape from the sample while at the same time keeping the laminate flat during drying, is applied for approximately 15 minutes. The pressure is next increased to about 400 pounds per square inch and held there for between 5 and 30 minutes to drive out all excess water.

The next step is to hot-press the laminate in a furnace at a temperature between 700° and 1100° C. and at a pressure in the range 1000–3000 pounds per square inch. The samples to be hot-pressed are inserted between two molybdenum sheets which are placed in turn between graphite or boron-nitride discs of different diameter, one of which contains a shallow well approximately ⅛ of an inch deep. The well and plunger arrangement facilitates centering of the sample and provides a more even distribution of the applied pressure. The soaking time at the peak temperature is not critical, durations of 1 minute to 2 hours having produced satisfactory laminates.

The synthetic mica laminate produced in this manner has a mechanical strength which is considerably greater than that of unbonded synthetic mica or of natural mica. In particular, the modulus of rupture of the bonded synthetic mica is more than three times as high as that of unbonded synthetic mica of the same thickness. Laminates of synthetic mica having thicknesses between 12 and 14 mils were tested for density, modulus of rupture, and dielectric strength after treatment of 800° C. and 2000 pounds per square inch pressure. Under these conditions the density of the unbonded laminate was 2.2 grams per cubic centimeter, the modulus of rupture 15,000 pounds per square inch and the dielectric strength 590 volts per mil. The results obtained with bonded mica when the amount of bonding mixture was varied between 0.5 and 10% of the weight of the entire laminate and the percentages of potassium orthophosphate, potassium tetraborate, and boric acid were held at 20%, 50%, and 30% respectively are given in the following table.

TABLE I

| Grams of Bonding Mixture (per 100 grams of mica) | Density of Laminate (grams per cubic centimeter) | Modulus of Rupture (pounds per square inch) | Dielectric Strength (volts per mil) |
|---|---|---|---|
| 0.5 | 2.4 | 45,000 | 860 |
| 1.0 | 2.4 | 47,000 | 880 |
| 3.5 | 2.4 | 50,000 | 940 |
| 5.5 | 2.5 | 60,000 | 710 |
| 7.0 | 2.5 | 57,000 | 670 |
| 10.0 | 2.5 | 51,000 | 730 |

The effect of varying the percentage of the constituents of the bonding mixture is shown in the following table. It shall be noted that a mixture of 20.0% potassium orthophosphate, 50% potassium tetraborate, and 30% boric acid produces the highest tensile strength and modulus of rupture within the ranges specified.

TABLE II

| Constituents of Bonding Mixture | | | Grams of Bonding Mixture per 100 grams of mica | Tensile Strength (Pounds per Square Inch) | Modulus of Rupture (Pounds per Square Inch) |
|---|---|---|---|---|---|
| Percentage of Potassium Orthophosphate | Percentage of Potassium Tetraborate | Percentage of Boric Acid | | | |
| 10 | 10 | 80 | 1.3 | 9,000–11,000 | 15,000–20,000 |
| 80 | 10 | 10 | 2.4 | 7,000–11,000 | 16,000–28,000 |
| 10 | 80 | 10 | 9.5 | 10,000–11,000 | 34,000–38,000 |
| 20 | 50 | 30 | 6.0 | 11,000–18,000 | 39,000–45,000 |

The use of potassium salts in the bonding mixture produces surprisingly improved results over those obtainable with other salts. For example, the modulus of rupture of a 10 mil sample of synthetic mica paper bonded with 20% potassium orthophosphate, 50% potassium tetraborate and 30% boric acid was 37,400 pounds per square inch while a similar sample bonded with 20% sodium orthophosphate, 50% sodium tetraborate and 30% boric acid was only 32,000 pounds per square inch under the same conditions of temperature and pressure. The reason for this 16% increase in the strength of the mica laminate bonded with a mixture containing potassium salts over that of a bonding mixture containing sodium salts is not precisely known. However, it is believed that the larger radius of the potassium ions provides a stronger bond with the fluorphlogopite matrix than is obtainable with other salts.

*Example I*

A first mat of 6.5 mil thickness was made by settling a synthetic mica flake slurry on to a Buchner funnel and then pressing the mat at 400 pounds per square inch and 110° C. for about 30 minutes. The tensile strength of the resulting product was 3400 pounds per square inch, the dielectric strength 580 volts per mil, and the modulus of rupture 11,000 pounds per square inch.

A second mat was made in the same manner as the first mat except that it was sprayed with a bonding mixture consisting of approximately 20% potassium orthophosphate, 50% potassium tetraborate and 30% boric acid, the bonding mixture comprising 3.8% by weight of the impregnated mat. After hot-pressing at 800° C. and 2,000 pounds per square inch for 1 hour, the tensile strength was found to be 9,600 pounds per square inch, the dielectric strength 790 volts per mil, and the modulus of rupture 31,000 pounds per square inch.

*Example II*

A first synthetic mica sample was prepared by laminating 6 sheets of 1.4 mil synthetic mica paper to form an unbonded laminate 8.4 mils thick. The tensile strength of this sample was 5,400 pounds per square inch, the dielectric strength 710 volts per mil, and the modulus of rupture 8,500 pounds per square inch.

A second sample was prepared by laminating sheets of 1.4 mil synthetic mica paper with a bonding mixture consisting of 6.8% by weight of the entire laminate. This laminate was pressed for about 15 minutes at a temperature of about 110° C. and a slight pressure just sufficient to permit the moisture in the sample to escape. Following this step, the pressure was increased to 400 pounds per square inch for 30 minutes. The tensile strength of the resulting product was 17,000 pounds per square inch, the dielectric strength 700 volts per mil, and the modulus of rupture 48,000 pounds per square inch.

A third sample containing 5.5% by weight of bonding mixture was prepared in the same manner as the second sample of this example and then hot-pressed at 800° C. and 2,000 pounds per square inch. The resulting bonded structure had a dielectric strength of 710 volts per mil and a modulus of rupture of 60,000 pounds per square inch. The tensile strength of this sample was higher than that of the second sample. However, its exact value could not be obtained due to limitations in the testing apparatus.

Thus, a synthetic mica product has been produced which has excellent mechanical and electrical strength. These properties have been achieved by impregnating sheets of fluorphlogopite with a bonding mixture composed of potassium orthophosphate, potassium tetraborate, and boric acid at relatively high temperatures and pressures.

What is claimed is:

The method of making a laminated electrically insulating material comprising the steps of interposing a bonding mixture between sheets of synthetic fluorphlogopite paper, said mixture consisting of 10–80% tertiary potassium orthophosphate, 10–80% potassium tetraborate, and 10–80% boric acid; applying sufficient pressure to the resulting laminated product for approximately fifteen minutes to permit moisture to escape therefrom and to keep the laminate flat; pressing the said product at a pressure of approximately 400 pounds per square inch and a temperature of 110° C. for approximately 30 minutes; increasing said pressure to 1,000–3,000 pounds per square inch and a temperature of 700–1,100° C.; allowing said product to cool; and removing the pressure from the resulting laminated electrically insulating material.

References Cited by the Examiner

UNITED STATES PATENTS

| 1,578,812 | 3/1926 | Dawes et al. | 264—110 |
| 2,196,973 | 4/1940 | Boughton et al. | 154—2.6 |
| 2,704,261 | 3/1955 | Comeforo. | |

FOREIGN PATENTS 461,879  12/1949  Canada.

OTHER REFERENCES

Grant: "Hackh's Chemical Dictionary," Published by McGraw-Hill Book Co., Inc. (New York), third edition, pp. 647 and 838 relied on.

ALEXANDER WYMAN, *Primary Examiner.*

EARL M. BERGERT, *Examiner.*